: US008423198B2

United States Patent
Wetzel et al.

(10) Patent No.: US 8,423,198 B2
(45) Date of Patent: Apr. 16, 2013

(54) ENERGY RESPONSE MANAGEMENT—TIME OF DAY METHOD

(75) Inventors: Timothy Martin Wetzel, Louisville, KY (US); Andrew Spanyer, Louisville, KY (US); Erick Graven, Louisville, KY (US); Martin Scott Mershon, Louisville, KY (US); Jerrold Dale, Jeffersonville, IN (US); Joshua Wiseman, Elizabethtown, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/956,479

(22) Filed: Nov. 30, 2010

(65) Prior Publication Data

US 2012/0095609 A1    Apr. 19, 2012

(51) Int. Cl.
  *G05B 11/01*    (2006.01)
(52) U.S. Cl.
  USPC ............... 700/296; 700/19; 700/295; 62/264
(58) Field of Classification Search .................. 700/296, 700/19, 295; 62/264; 307/35; 219/483, 219/493
  See application file for complete search history.

(56) References Cited

U.S. PATENT DOCUMENTS

| | | | |
|---|---|---|---|
| 4,247,158 A * | 1/1981 | Quayle | ......................... 312/213 |
| 4,247,786 A | 1/1981 | Hedges | |
| 6,817,195 B2 | 11/2004 | Rafalovich et al. | |
| 7,010,363 B2 | 3/2006 | Donnelly et al. | |
| 7,110,832 B2 | 9/2006 | Ghent | |
| 7,266,962 B2 | 9/2007 | Montuoro et al. | |
| 2003/0233201 A1 | 12/2003 | Horst et al. | |
| 2007/0220907 A1 | 9/2007 | Ehlers | |
| 2008/0106147 A1 | 5/2008 | Caggiano et al. | |
| 2010/0101254 A1 | 4/2010 | Besore | |

OTHER PUBLICATIONS

Energy-saving steps put money in pocket :[Five Star Sports Final Edition]. (Apr. 12, 1987). Chicago Sun—Times,p. 2e. Retrieved Jan. 3, 2012, from Business Dateline.*

* cited by examiner

*Primary Examiner* — Dave Robertson
(74) *Attorney, Agent, or Firm* — Global Patent Operation

(57) ABSTRACT

An energy management system is provided for an appliance comprising: an interface to receive a schedule having an off-peak time segment and an on-peak time segment; a control to determine an operation to be performed by the appliance; a mode selecting device to select between an energy management mode and an immediate start mode. A controller includes a memory for storing the schedule and firmware to determine whether there is any off-peak time segments and other time sub-segments between a current time and a deadline for completing the operation. Upon selection of the energy management mode, the controller is arranged to initiate the operation, including a reduction in power consumption to complete the operation, when an amount of time required to complete the operation maximizes the off-peak time segment and sub-segments between the current time and the deadline.

18 Claims, 2 Drawing Sheets

ENERGY RESPONSE MANAGEMENT—TIME OF DAY METHOD

BACKGROUND

Many power providers are currently experiencing a shortage of electric generating capacity due to increasing consumer demand for electricity. More specifically, generating plants are often unable to meet peak power demands resulting from a electricity demanded by many consumers at the same time.

In order to reduce high peak power demand, many power providers have instituted time of use metering and rates which include higher rates for energy usage during on-peak times and lower rates for energy usage during off-peak times. As a result, consumers are provided with an incentive to use electricity at off-peak times rather than on-peak times.

Presently, to take advantage of the lower cost of electricity during off-peak times, a user must manually operate appliances or other electronic devices during the off-peak times. This is undesirable because a consumer may not always be present in the home, or awake, to operate the appliance during off-peak hours. This is also undesirable because the consumer is required to manually track the current time to determine what hours are off-peak and on-peak. Therefore, there is a need to provide a system that facilitates operating appliances during off-peak hours in order to reduce consumer's electric bills and also to reduce the load on generating plants during on-peak hours. Alternatively, expensive and cumbersome devices have been used for operating appliances that require separate installation and connection.

SUMMARY

The present invention provides a process for managing energy usage of an appliance. The process includes receiving a schedule having an off-peak time segment and an on-peak time segment; storing the schedule in a memory; determining a current time; and, determining an operation that needs to be performed by the appliance.

One aspect of the present disclosure provides a method for managing energy usage of a dishwasher including an internal time keeping mechanism, comprising: receiving a schedule having an off-peak time segment and an on-peak time segment; storing the schedule in a memory; monitoring time of day; determining an operation that needs to be performed by the dishwasher and a deadline for completing the operation; determining a first amount of time between the current time and the deadline, and if the first amount of time includes an overnight time period; determining a second amount of time required to complete the operation; initiating the operation to maximize the second amount of time scheduled during the off-peak time segment between the current time and the deadline; and, deactivating a heating element if a heated drying operation is during the overnight time period.

Another aspect of the present disclosure provides an energy management system for an appliance comprising: a means for determining a schedule having an off-peak time segment and an on-peak time segment; a means for automatically determining a current time; a means for determining an operation to be performed by the appliance and a deadline for completing the operation; a means for determining a first amount of time between the current time and the deadline and if the first amount of time includes an overnight time period; a means for determining a second amount of time required to complete the operation; a means for initiating the operation to maximize the second amount of time scheduled during the off-peak time segment between the current time and the deadline; and, deactivating an element of the operation if the operation is during the overnight time period.

And yet another aspect of the present disclosure provides an energy management system for an appliance comprising: an interface to receive a schedule having an off-peak time segment and an on-peak time segment; a control to determine an operation to be performed by the appliance; a mode selecting device to select between an energy management mode and an immediate start mode; and a controller connected to the interface, the control, and the mode selecting device; the controller includes a memory for storing the schedule and firmware to determine whether there is any off-peak time segments and overnight time periods between a current time and a deadline for completing the operation; wherein upon selection of the energy management mode, the controller is arranged to initiate the operation when an amount of time required to complete the operation maximizes the off-peak time segment between the current time and the deadline; and upon selection of the immediate start mode, the controller is arranged to initiate the operation immediately; and, deactivating an element of the operation if the operation is during the overnight time period.

DETAILED DESCRIPTION

The present disclosure provides a cost effective solution for appliances to counteract rising utility costs and sliding rate schedules. To be described in more detail hereinafter, the disclosure provides a self-contained time keeping means or mechanism within the appliance which does not require separate and additional modules or components to operate.

The present invention provides an energy management system that may be used with an appliance in order to reduce household electricity costs and also to reduce the load on generating plants during peak hours of electricity usage. The energy management system is applicable to any type of appliance such as, but not limited to, a dryer, a washing machine, a dishwasher 10 (FIG. 1), an oven, a microwave oven, a water heater, or a refrigerator. For illustration purposes, the present invention will be described in association with a dishwasher.

Figure 1:
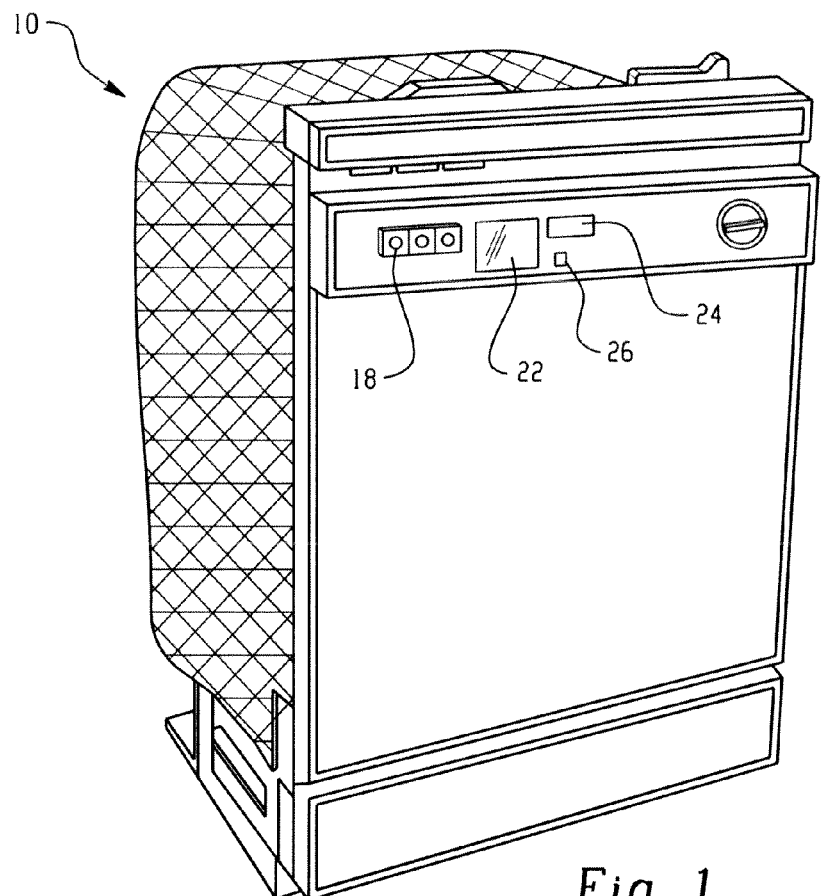
FIG. 1 is a perspective view of a dishwasher utilizing the energy management system of the present invention.

Referring to FIG. 1, it is to be appreciated that the dishwasher 10 can have a loading compartment, a motor to rotate the spray arms, dishwasher cycles, a heater (not shown) for boosting water temperature and/or for heating the compartment during heated dry cycles, and a control panel 18. The control panel 18 may provide control knobs or any other type of interface for selecting an operation cycle of the dishwasher. For example, the control panel 18 may be used to select between regular, heavy duty, or light wash cycles.

In one embodiment, the energy management system may include a user interface 22, a time keeping mechanism 24, and a mode selecting device 26. The user interface 22 may be any type of interface such as a touch screen, knobs, sliders, buttons, speech recognition, etc, to allow a user to input a schedule of on-peak times and off-peak times for each day of the week. The schedule of on-peak times and off-peak times for a household may typically be obtained from a generating plant or power utility that services the household. The schedule may be obtained from published tables made available to the public. If the schedule of times changes, the user may use the user interface to alter the schedule that was previously entered.

The terms on-peak and off-peak, as used herein are meant to encompass time periods that an energy supplier has designated as referring to periods of high energy demand or cost and periods of low energy demand or cost, respectively. It may be that in some situations, multiple levels are designated by the energy supplier and thus on-peak is meant to refer to those periods where the energy demand or cost is greater than some other period, with the other period being referred to as off-peak. In any given situation, on-peak may not be the highest level and off-peak may not be the lowest level.

The energy management system's time keeping mechanism 24 can also provide information regarding the current time of the day and can monitor the time of day. In one embodiment, the time keeping mechanism 24 also includes a calendar function to provide information regarding the day of the week and the current date. The current time and date may be input or adjusted by the user via controls on the time keeping mechanism 24.

Utility companies are starting to develop sliding rate scales based upon time of use for power consumption. An appliance, for example a dishwasher to be used for illustrative purposes, that can manage responses to different rate schedules will have an advantage in the marketplace. A time of day (TOD) input to the dishwasher can allow the unit to run at times when utility rates are low or off-peak. The time of day input can be manually entered or automatically received by the dishwasher. Examples of automatic updating comprise a radio wave or radio clock to sync to an atomic clock signal. The time of day feature or off-peak manager will effectively save the consumer money by running the appliance according to a pre-determined schedule of when the rates are lower.

The mode selecting device 26 allows the user to choose between an energy management mode and an immediate start mode. The mode selecting device 26 may be a single button such that the energy management mode is selected when the button is depressed and the immediate start mode is selected when the button is not depressed, or vice versa. Alternatively, the mode selecting device 26 may also be two separate buttons, a switch, a touch panel, or any other type of device that allows for selection between two modes. Although the control panel 18, the user interface 22, the time keeping mechanism 24, and the mode selecting device 26 are illustrated as four separate elements in FIG. 1, each of these elements, or any combination thereof, may alternatively be incorporated into a single interface or display to provide for ease of use.

The method of saving energy comprises utilizing an algorithm in the dishwasher control to compare the time of day to a known (where user input) utility rate schedule. The algorithm will allow the unit to be run during lower rate time periods and keep the unit from running during the more expensive or critical rate periods. This results in an optional mode of operation for the dishwasher that the user can select to take advantage of lower utility costs during off peak time periods. It is to be appreciated that the on-peak and off-peak time segments can also include sub-segments comprising, for example, day and night segments, home and away segments (i.e. home occupied or home vacant), weekday and weekend segments, that can be layered onto the energy savings (i.e. established hierarchies) such that the start and run time for an appliance can be adjusted based on on-peak and off-peak and one or more sub-segments. In this manner, an appliance can adjust the power consumption by selecting components (and associated running times) used during operating cycles based on a time segment (on-peak and off-peak) and time sub-segments (i.e. day and night). The aforementioned also comprises operating a component at a state between on and off, i.e. variable power motor, heater, or other electrical component.

The invention provides the time keeping mechanism 24 contained within (i.e. integral with) the appliance and which does not require additional modules or components to operate. Additional hardware that may be necessary include a radio receiver if the time of day updates are to occur automatically. The cost effective nature of the invention allows the energy saving dishwasher features to be available at lower price points than previously could be obtained. The self contained nature of the aforementioned device is advantageous since no additional wiring or kits/modules are required to provide the benefits around a sliding rate schedule.

Figure 2:
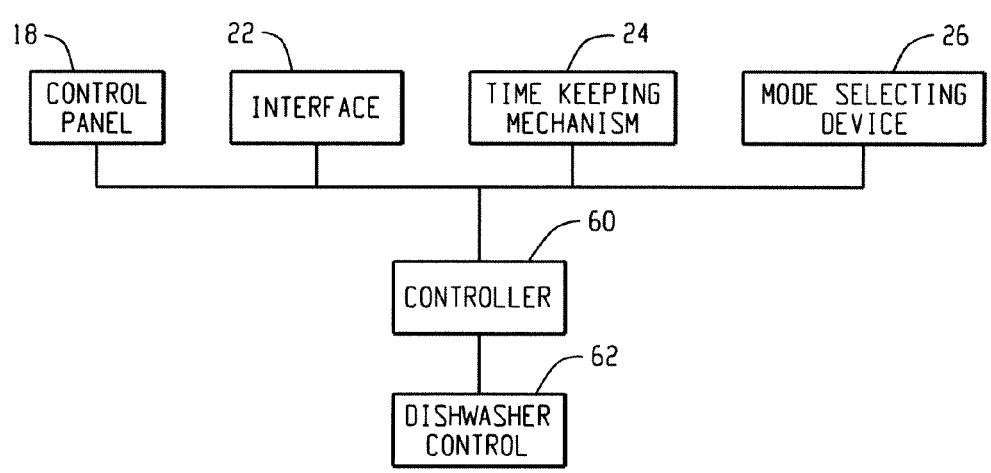
FIG. 2 is a block diagram of an appliance incorporating the energy management system; and, FIG. 3 is a flow chart for initiating and performing the energy management system of the present invention.

As illustrated in FIG. 2, the energy management system further includes a controller 60 connected to the control panel 18 and the mode selecting device 26 in order to receive signals regarding the operation selected by the user via the control panel and the mode selected by the user via the mode selecting device. The controller 60 is also connected to the user interface 22 and the time keeping mechanism 24, and preferably includes a memory for storing the schedule of on-peak and off-peak times input via the user interface, as well as the current time and date. In one embodiment, the controller has a circuit, software, and/or firmware (hereafter collectively referred to as "firmware") to determine a time to initiate the selected operation based on the selected mode. The controller 60 is further connected to a dishwasher control 62 that controls the spray aims, the motor, the heater, and the dishwasher cycles pursuant to signals sent from the controller to the dishwasher control.

If the energy management mode is selected by the user, the energy management system, and specifically the controller, will signal the dishwasher control to initiate a washing cycle selected by the user at the next off-peak time that allows for the washing cycle to be completed entirely within the off-peak time segment. As a result, the washing cycle will be performed during an off-peak time when the rates for electricity are cheaper and the load on the generating plant that provides power for the household is at a lower level. Alternatively, if the user selects the immediate start mode, the energy management system is disabled and the washing cycle is initiated immediately as in a conventional dishwasher.

As an alternative embodiment, if the energy management system is used with a dishwasher and the consumer elects to run the dishwasher at a time during off peak hours, the heater element could be deactivated during an overnight cycle allowing the contents to dry over time. The internal time keeping mechanism would know what time the dishwasher started and control the operation of the heater based on this time.

The internal time keeping mechanism in the dishwasher provides the exact local time and calendar. If a consumer selects a dishwasher cycle via an overnight cycle, the internal time keeping mechanism would prohibit the heater from turning on (hence, saving energy and money on the consumer's utility bill). The resulting drying action would occur over an extended period of time. In this manner, the appliance can adjust the power consumption by selecting or de-selecting components (and associated running times) used during the operating cycle based on a time segment (peak and off-peak) and time sub-segment (day and night). This includes operating the component at a state between on and off, i.e. variable power motor, heater, or other electrical component.

It should be understood that if the energy management system is used with a washing machine, the controller may be connected to a washer control to actuate components of the washing machine, including a motor and various valves, to initiate a selected washing cycle according to the selected mode. Similarly, when used with a dryer, the controller may be connected to a dryer control to initiate a selected drying cycle, and in an oven, the controller may be connected to an oven control to initiate a selected self cleaning cycle.

Figure 3:
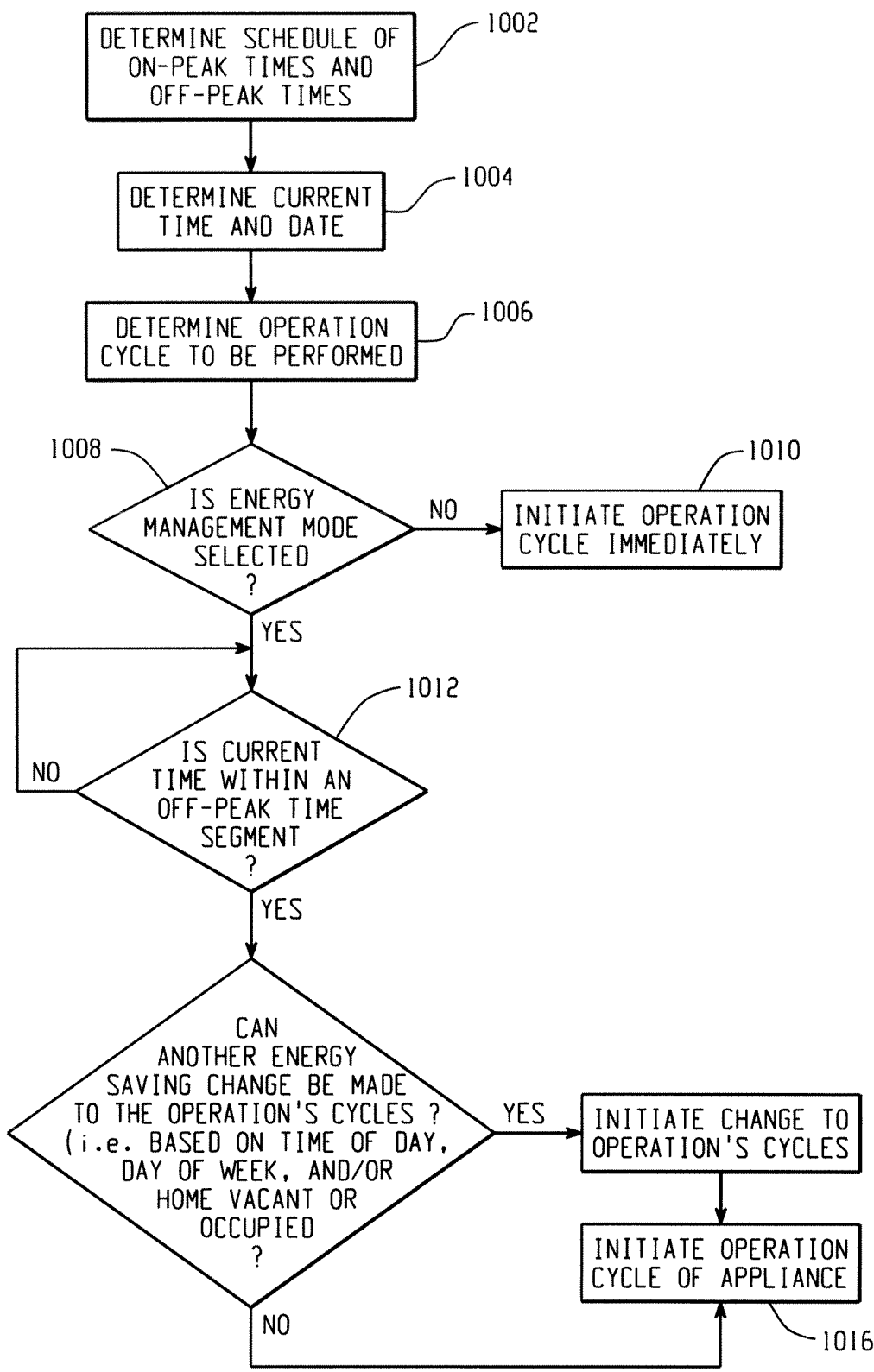
Figure 3:
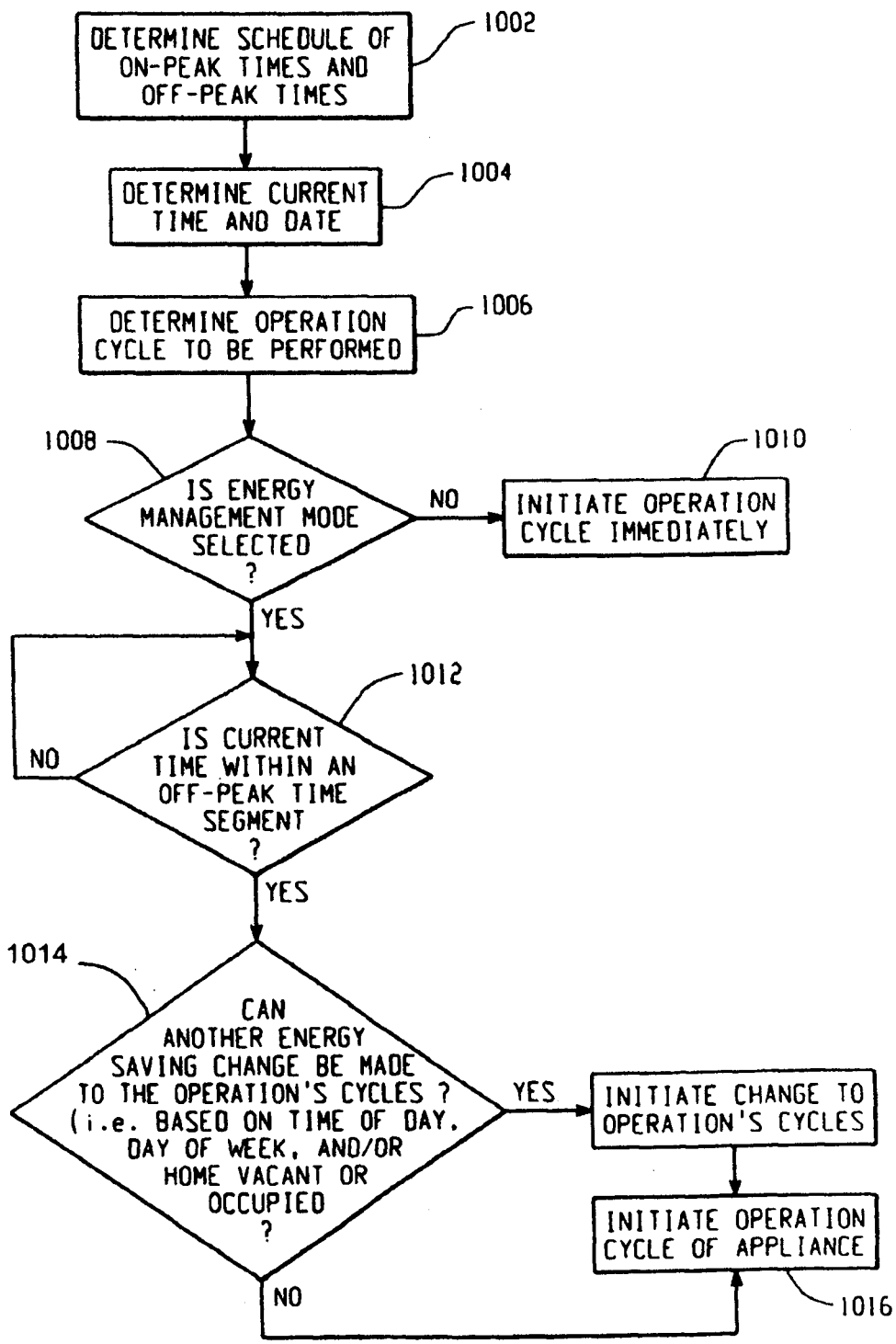

FIG. 3 illustrates a method for initiating and performing the energy management system. In Step 1002, the schedule of on-peak times and off-peak times for each day of the week is determined and preferably stored in the memory in the controller. Step 1004 then determines the current time. As discussed above, both the schedule and the current time may be input manually via a user interface in the appliance or automatically updated into the internal time keeping mechanism. In Step 1006, the user then selects an operation cycle to be performed by the appliance via the control panel, and in Step 1008, the user selects between the energy management mode and the immediate start mode via the mode selecting device.

If the user selects the immediate start mode, the process proceeds to Step 1010 and the operation cycle is initiated immediately. If the user selects the energy management mode in Step 1008, the controller accesses the schedule of on-peak times and off-peak times and checks whether the current time is within an off-peak time segment (Step 1012). If the current time is not within an off-peak time segment, the selected operation cycle is not initiated and the process remains at Step 1012 until the current time is within an off-peak time segment. If, in Step 1012, the controller determines that the current time is within an off-peak time segment, the process may proceed to optional Step 1014. If optional Step 1014 is not utilized, the process will proceed to Step 1016 to initiate the operation cycle.

Additionally, it should be noted that the operation cycle to be performed need not be selected manually by a user. The appliance may also include a control to detect an operation that is automatically requested by the appliance. As an example, a control in a refrigerator may include a sensor to detect when the ice reservoir requires replenishment. Accordingly, the sensor would send a signal to the controller requesting that the ice maker be actuated to provide more ice. If the energy management mode is selected on the refrigerator, the ice making operation cycle will only be initiated during an off-peak time segment, and preferably during an off-peak time segment that allows for the operation cycle to be completed within the off-peak time segment, as discussed above.

In another embodiment, the user interface may also allow the user to input a deadline by which the operation cycle must be completed. In one approach, the energy management system may simply initiate the operation cycle if the deadline is approached. For example, at 9:00 AM a user may select a washing cycle that requires 1 hour to complete, with a deadline for completing the task by 3:00 PM. If by 2:00 PM, there has been no off-peak time segment that allows for the operation cycle to be completed entirely within the off-peak time segment, the controller will signal the dishwashing control to initiate the washing cycle in order to complete the task by the requested deadline.

Alternatively, the controller may be adapted to prospectively analyze the schedule of on-peak and off-peak time segments and sub-segments between the time at which the operation cycle was requested and the deadline. By doing so, the energy management system may maximize the portion of the operation cycle that is performed during off-peak hours and during preferred sub-segment hours. As in the above example, at 9:00 AM a user may select a drying cycle that requires 1 hour to complete, with a deadline for completing the task by 3:00 PM. In this approach, the controller analyzes the schedule between 9:00 AM and 3:00 PM to determine if there is an off-peak time segment that allows for the entire operation cycle to be completed entirely within the off-peak time segment. If such an off-peak time segment exists, the operation will be conducted at the beginning of this off-peak time segment. If there is no off-peak time segment long enough to complete the entire operation cycle, the controller will determine the longest off-peak time segment available prior to the deadline in order to complete as much of the operation as possible within an off-peak time segment.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A method for managing energy usage of an appliance comprising:
   receiving, in a controller of the appliance, a schedule having an off-peak time segment and an on-peak time segment;
   storing the schedule in a memory of the controller;
   determining a current time from a time device integrated into the appliance;
   detecting a request for an operation to be performed by the appliance and a deadline for completing the operation;
   determining, in the controller, a first amount of time between the current time and the deadline, and if the first amount of time includes a time sub-segment period and the off-peak time segment;
   determining, in the controller, a second amount of time required to complete the operation under a normal power consumption mode;
   determining, in the controller, a third amount of time required to complete the operation under a reduced power consumption mode wherein the third amount of time is greater than the second amount of time;
   the controller polling the time device in the appliance to determine the current time and comparing the current time to a start time and an end time of the off-peak time segment;
   the controller automatically delaying an initiation of the operation of the appliance under the normal power consumption mode until the start time of the off-peak time segment and if the first amount of time is greater than the second amount of time; and
   the controller automatically initiating the operation of the appliance under the reduced power consumption mode if the first amount of time includes the time sub-segment period, the controller detects a condition corresponding to the time sub-segment period and if the first amount of time is greater than the third amount of time,
   wherein the controller is configured to:
      automatically switching an initiated operation of the appliance from the normal consumption mode to the reduced power consumption mode when, during the off-peak time segment, the controller determines that the first amount of time is greater than the third amount of time and the condition corresponding to the time sub-segment period is detected; and
      automatically switching an initiated operation of the appliance to the normal consumption mode from the reduced power consumption mode when the third amount of time is greater than the first amount of time.

2. The method of claim 1 wherein the step of receiving a schedule includes inputting the schedule via a user interface on the appliance.

3. The method of claim 1 wherein detecting a request for an operation includes detecting a selection of an operation of the appliance via a control panel on the appliance.

4. The method of claim 1, wherein the appliance is a dishwasher; and,
wherein the reduced power consumption mode includes a deactivation of a heating element.

5. The method of claim 1, wherein detecting a condition corresponding to the time sub-segment period comprises detecting one or more of a time of day, a day of week or an occupancy.

6. The method of claim 1, wherein detecting a request for an operation to be performed by the appliance includes detecting an operation automatically initiated by the appliance.

7. The method of claim 1, wherein the controller automatically initiating the operation of the appliance under the reduced power consumption mode comprises operating the appliance in a variable state between an on state and an off state.

8. An energy management system for an appliance comprising:
a controller for determining a schedule comprising an off-peak time segment and an on-peak time segment;
a time keeping device for determining a current time;
a mode selecting device for determining an operation to be performed by the appliance;
wherein the controller is configured to:
determine a first amount of time between the current time and an end of the off-peak time segment and whether the first amount of time includes a time sub-segment;
determine a second amount of time required to complete the operation, wherein the operation includes a reduced power consumption mode and a longer cycle time relative to a normal operation;
initiate the operation under a normal consumption mode if the current time is within the off-peak time segment and the first amount of time is greater than the second amount of time;
automatically switch the initiated operation from the normal consumption mode to the reduced power consumption mode when a condition satisfying the time sub-segment is detected by the controller and a third amount of time is less than the first amount of time; and
automatically switching the initiated operation of the appliance to the normal consumption mode from the reduced power consumption mode when the longer cycle time relative to the normal operation exceeds the first amount of time.

9. The energy management system of claim 8 wherein the controller for determining a schedule includes a user interface to input the schedule.

10. The energy management system of claim 9, comprising a memory located in the appliance that is configured to store the schedule from the controller.

11. The energy management system of claim 8, wherein the appliance is a dishwasher; and,
wherein the operation including a reduced power consumption mode and a longer cycle time relative to a normal operation comprises a deactivation of a heating element.

12. An energy management system for an appliance comprising:
an interface to receive a schedule having an off-peak time segment and an on-peak time segment;
a controller configured to determine an operation to be performed by the appliance;
a mode selecting device configured to select between an energy management mode and an immediate start mode;
wherein the energy management mode comprises a reduction in power consumption and includes an amount of time to complete the operation in the energy management mode that is greater than an amount of time to complete the operation in the immediate start mode;
the controller being connected to the interface and the mode selecting device;
wherein upon detection of a selection of the energy management mode, the controller is configured to initiate the operation when a current time is within the off-peak time segment and if an amount of time between the current time and an end of the off-peak time segment is greater than an amount of time required to complete the operation in the energy management mode;
upon detection of a selection of the immediate start mode, the controller is arranged to initiate the operation in a normal operating mode;
the controller being further configured to detect a time sub-segment in the energy management mode or normal operating mode, determine a time required to complete the operation in a reduced power consumption mode, and automatically switch the operation from the normal operating mode to the reduced power consumption mode when the amount of time required to complete the operation in the reduced power consumption mode is less than an amount of time required to complete the operation; and
wherein the controller is configured to automatically switch an initiated operation of the appliance to the normal operating mode from the reduced power consumption mode when the amount of time required to complete the operation is less than the amount of time required to complete the operation in the reduced power consumption mode.

13. The energy management system of claim 12 wherein the controller includes a memory for storing the schedule and firmware to determine whether the current time is within the off-peak time-segment.

14. The energy management system of claim 13 wherein the interface is a user interface located on the appliance.

15. The energy management system of claim 14 wherein the control is a control panel located on the appliance and configured to allow user selection of the operation.

16. The energy management system of claim 15 further comprising a clock for providing the current time.

17. The energy management system of claim 16 wherein the appliance is selected from the group consisting of a washing machine, a dishwasher, an oven, and a refrigerator.

18. The energy management system of claim 12, wherein the appliance is a dishwasher; and,
wherein the amount of time to complete the operation in the energy management mode comprises a deactivation of a heating element.

* * * * *

UNITED STATES PATENT AND TRADEMARK OFFICE
CERTIFICATE OF CORRECTION

| | | |
|---|---|---|
| PATENT NO. | : 8,423,198 B2 | |
| APPLICATION NO. | : 12/956479 | |
| DATED | : April 16, 2013 | |
| INVENTOR(S) | : Wetzel et al. | |

It is certified that error appears in the above-identified patent and that said Letters Patent is hereby corrected as shown below:

In the Drawings

In the drawing sheets, consisting of Fig. 3, should be deleted to be replaced with the drawing sheet, consisting of Fig. 3, as shown on the attached pages.

In the Specifications

In Column 4, line 32, delete "aims," and insert -- arms, --, therefor.

Signed and Sealed this
Eighth Day of October, 2013

Teresa Stanek Rea
*Deputy Director of the United States Patent and Trademark Office*